(12) United States Patent
Smyth et al.

(10) Patent No.: US 7,660,888 B2
(45) Date of Patent: Feb. 9, 2010

(54) INDICATING NETWORK RESOURCE AVAILABILITY METHODS, SYSTEM AND PROGRAM PRODUCT

(75) Inventors: John S. Smyth, Milton, VT (US);
William H. Wagner, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 10/709,671

(22) Filed: May 21, 2004

(65) Prior Publication Data

US 2005/0262244 A1    Nov. 24, 2005

(51) Int. Cl.
*G06F 15/173* (2006.01)
*G06F 15/16* (2006.01)

(52) U.S. Cl. .................... 709/224; 709/203; 709/227

(58) Field of Classification Search .............. 709/226, 709/229, 224, 219, 203, 227, 228
See application file for complete search history.

(56) References Cited

U.S. PATENT DOCUMENTS

| 5,261,044 | A | * | 11/1993 | Dev et al. ................... 715/855 |
| 5,566,297 | A |   | 10/1996 | Devarakonda et al. ........ 714/15 |
| 5,761,432 | A | * | 6/1998  | Bergholm et al. ........... 709/226 |
| 5,864,563 | A | * | 1/1999  | Ratcliffe .................... 714/712 |
| 6,070,190 | A | * | 5/2000  | Reps et al. .................. 709/224 |
| 6,463,492 | B1 |  | 10/2002 | Engfer et al. ................ 710/260 |
| 6,934,934 | B1 | * | 8/2005 | Osborne et al. ............. 717/126 |
| 2002/0112050 | A1 | * | 8/2002 | Ullmann et al. ............. 709/224 |
| 2002/0184361 | A1 | * | 12/2002 | Eden ......................... 709/224 |
| 2003/0065763 | A1 | * | 4/2003 | Swildens et al. ............. 709/224 |
| 2003/0088677 | A1 |  | 5/2003 | Yamamoto ................... 709/227 |
| 2003/0163721 | A1 |  | 8/2003 | Hildenbrand, Jr. et al. ..... 726/7 |
| 2003/0208599 | A1 | * | 11/2003 | Asano et al. ................ 709/226 |
| 2004/0010584 | A1 | * | 1/2004 | Peterson et al. ............. 709/224 |
| 2004/0107267 | A1 | * | 6/2004 | Donker et al. ............... 709/218 |
| 2004/0122871 | A1 | * | 6/2004 | Hansen et al. ............... 707/204 |

FOREIGN PATENT DOCUMENTS

DE        19647655 A1    5/1998

OTHER PUBLICATIONS

Hanson, Eric N., et al., "A Flexible and Recoverable Client/Server Database Event Notification System," The VLDB Journal (1998) vol. 7, pp. 12-24.

(Continued)

*Primary Examiner*—Andrew Caldwell
*Assistant Examiner*—Jason Recek
(74) *Attorney, Agent, or Firm*—Richard Kotulak; Hoffman Warnick LLC

(57) ABSTRACT

Methods, system and program product for determining network resource availability in order to avoid time delays caused by querying unavailable resources are disclosed. In one embodiment, the invention queries the network resource to determine network resource availability and response time, and indicates the network resource is available only if the network resource is determined to be available within a specified response time.

25 Claims, 5 Drawing Sheets

OTHER PUBLICATIONS

Braumandl, R., et al., "ObjectGlobe: Ubiquitous Query Processing on the Internet," The VLDB Journal (2001) vol. 10, pp. 48-71.

Perkovic, Dejan, et al., "Responsiveness Without Interrupts," ICS (1999) Rhodes Greece, pp. 101-108.

Gruber, Robert E., et al., "High-Level Constructs in the READY Event Notification System," AT&T Labs—Research (1999) http://www.dsg.cs.tcd.ie/~vjcahill/sigops98/papers/gruber.ps, pp. 195-202.

Yang Ey, et al., "Private Information Retrieval in the Presence of Malicious Failures," IEEE Computer Society, Proceedings of the 26th Annual International Computer Software and Applications Conference (COMPSAC '02) Oxford, UK, Aug. 2002, pp. 805-810.

Wood, Alan P., "An Analysis of Client/Server Outage Data," IEEE Computer Society, Proceedings of the International Computer Performance and Dependability Symposium (IPDS '95) Erlangen, Germany, Apr. 1995, pp. 295-304.

* cited by examiner

INDICATING NETWORK RESOURCE AVAILABILITY METHODS, SYSTEM AND PROGRAM PRODUCT

BACKGROUND OF INVENTION

1. Technical Field

The present invention relates generally to client-server environments, and more particularly, to methods, system and program product for indicating the availability of a network resource.

2. Related Art

Referring to FIG. 1, in a networked computer system 2 where individual client systems 4 must access a network resource 6, problems are encountered when a client system 4 attempts to access network resource 6 when it is unavailable. Unavailability can be caused by a myriad of situations such as the network resource, or a part thereof, being shut down or locking. Unavailability results in long timeout intervals in which access to network resource 6 is blocked. For example, where network resource 6 is a server, when the server's file directory is unavailable, the server is generally unavailable. In these situations, a client system 4 application may 'hang up' as it tries to interface with the network resource. This 'hang up' creates unexpected delays that can result in problems such as a user assuming client system 4 has crashed or actual application lockage. In one example, delays of several minutes are incurred when a client system application is seeking to interface with a file server with an unavailable file directory.

Known solutions to this problem include tracking system management events through a system management interrupt (SMI) handler. SMI handlers operate within the network resource to react to problems, and may log events in memory or a system register. In another approach, an SMI handler may notify applications of a change in network resource status. However, this approach is generally limited to system recognized "system management" issues, such as the opening of a panel or a temperature excursion. Problems related to the availability of network-accessible file systems not related to lower level hardware issues are likely not to be detected in real-time by system management monitoring. In another approach, various applications are offered that can poll the network resource register or file systems to determine if there has been a change in system status. These solutions, however, are limited as polling from a multitude of client systems in a networked environment expends resources necessary for other functions.

In view of the foregoing, there is a need in the art for a way to determine network resource availability in order to avoid time delays caused by querying unavailable resources.

SUMMARY OF INVENTION

The invention includes methods, system and program product for determining network resource availability in order to avoid time delays caused by querying unavailable resources. In one embodiment, the invention queries the network resource to determine network resource availability and response time, and indicates the network resource is available only if the network resource is determined to be available within a specified response time.

A first aspect of the invention is directed to a method for indicating availability of a network resource in a client-server environment, the method comprising the steps of: querying the network resource to determine network resource availability and response time, and setting a status indicator with the network resource availability; in the case that the status indicator indicates that the network resource is available, determining whether a query of the network resource is occurring; and in the case that a query is occurring, indicating the network resource is available only if an expanded time of the query is less than a specified response time.

A second aspect of the invention is directed to a system for indicating availability of a network resource in a client-server environment, the system comprising: a query component that determines network resource availability and response time; and a status component that communicates the network resource availability as available only if the network resource is available within a specified response time.

A third aspect of the invention is directed to a computer program product comprising a computer useable medium having computer readable program code embodied therein for indicating availability of a network resource in a client-server environment, the program product comprising: program code configured to query the network resource to determine network resource availability and response time, and set a status indicator with the network resource availability; and program code configured to indicate a status of the network resource by: determining, in the case that the status indicator indicates that the network resource is available, whether a query of the network resource is occurring; and indicating, in the case that a query is occurring, the network resource is available only if an expanded time of the query is less than a specified response time.

A fourth aspect of the invention is directed to a method for indicating availability of a network resource in a client-server environment, the method comprising the steps of: querying the network resource to determine network resource availability and response time; and indicating the network resource is available only if the network resource is determined to be available within a specified response time.

A fifth aspect of the invention is directed to a system for deploying a network resource availability indication application, comprising: a computer infrastructure being operable to: receive a query from a client regarding the availability of the network resource; query the network resource to determine network resource availability and response time; set a status indicator with the network resource availability; determining whether a query of the network resource is occurring in the case that the status indicator indicates that the network resource is available; and provide an indication to the client that the network resource is available only if an expanded time of the query is less than a specified response time in the case that a query is occurring.

The foregoing and other features of the invention will be apparent from the following more particular description of embodiments of the invention.

BRIEF DESCRIPTION OF DRAWINGS

The embodiments of this invention will be described in detail, with reference to the following figures, wherein like designations denote like elements, and wherein.

DETAILED DESCRIPTION

The invention includes methods, system and program product that allow client system applications in a networked system to determine the availability of a network resource such as a server's file system, in order to avoid time delays caused by querying unavailable resources. In one embodiment, the invention implements a single system on the network to query a network resource in the form of a server at regular intervals to determine whether the server is available. However, the invention is applicable relative to a variety of other network resources.

The results of the querying are stored in memory on this system and made available, e.g., via TCP/IP, to client systems. All other systems on the network may query this system to quickly determine the state of the servers before attempting to negotiate a connection and transfer files from or to a server. By storing the status of network resources on a single system on the network and dedicating TCP/IP ports to providing the status of the server, networked systems do not need to individually query the network resource to determine availability. Furthermore, by providing the information about the availability of the file systems on the server at the TCP/IP level of the polling system, the status of the server can be communicated to the networked systems on request more quickly than checking file systems.

Figure 1:
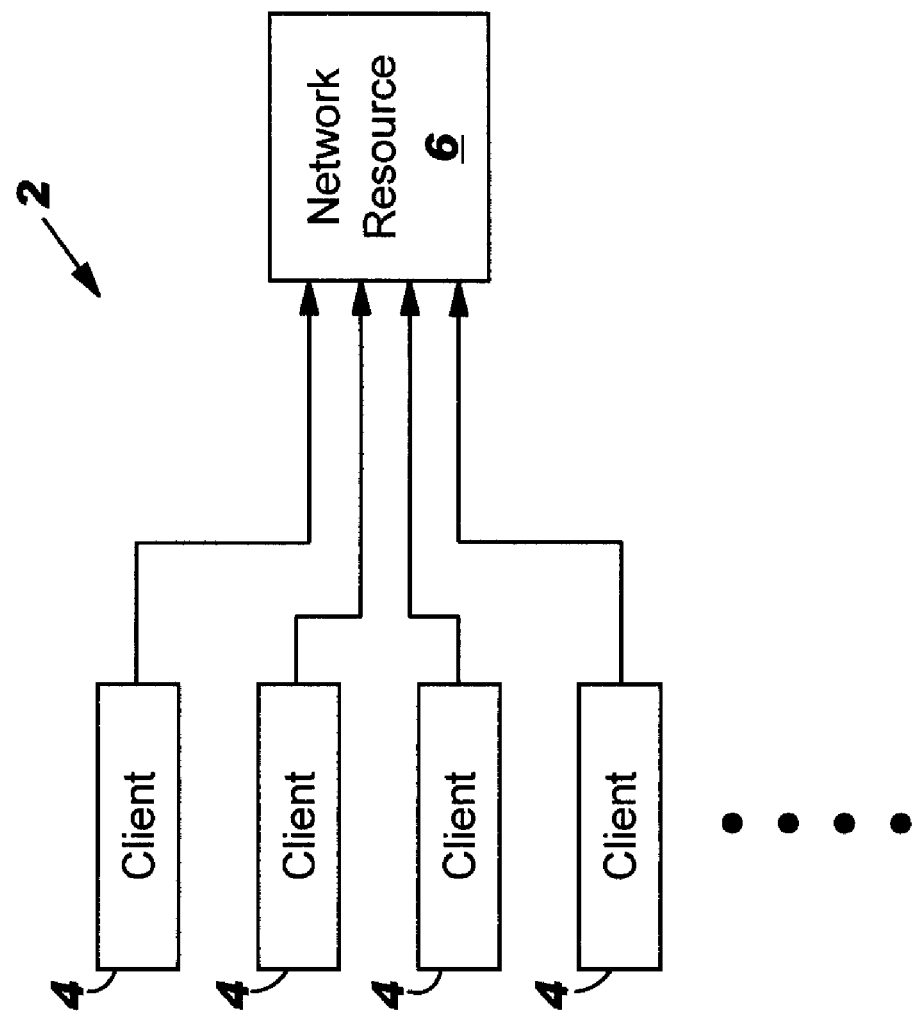
FIG. 1 shows a block diagram of a prior art client-network resource environment.
Figure 2:
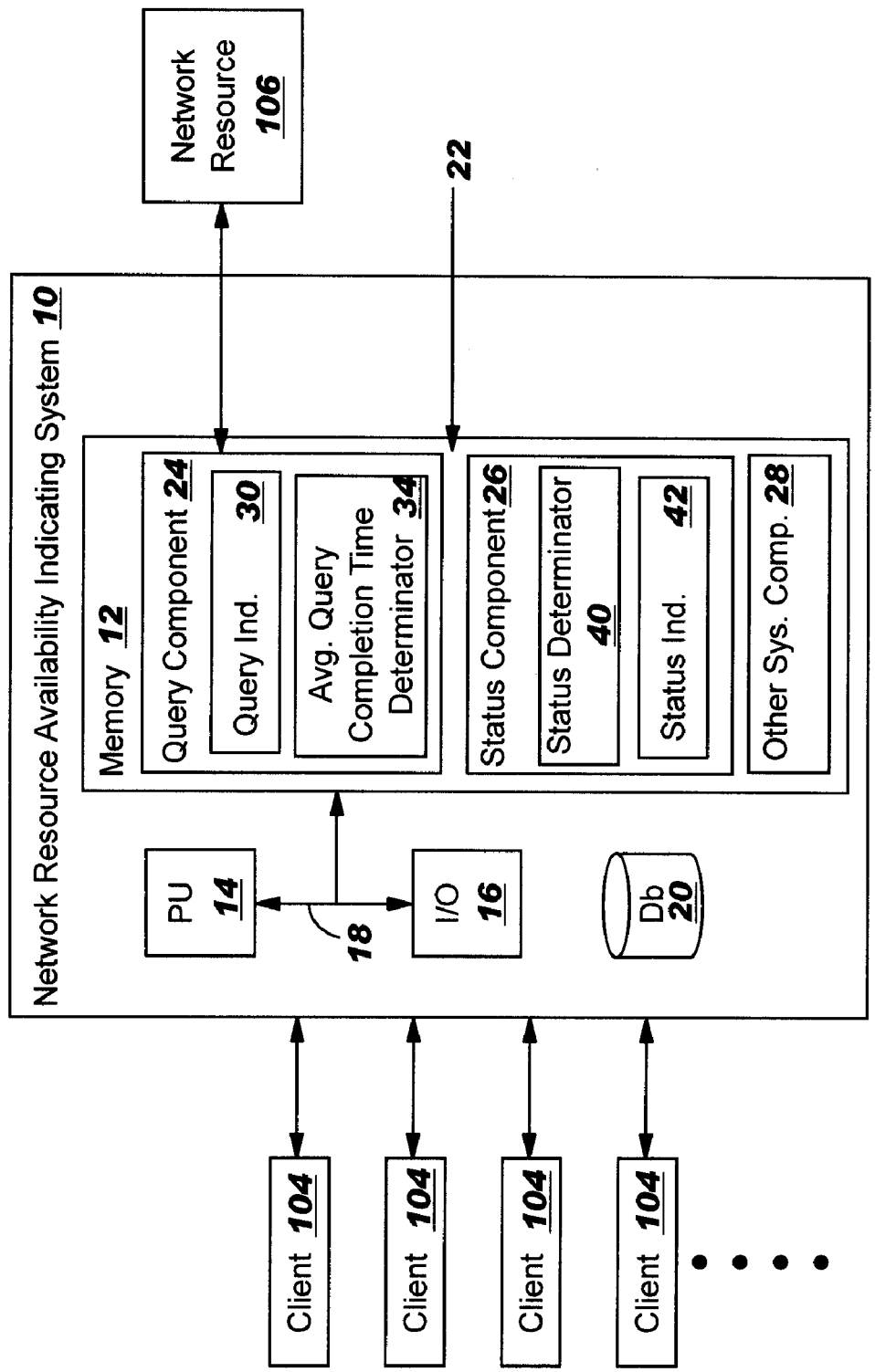
FIG. 2 shows a block diagram of a client-network resource environment according to the invention including a network resource availability indicating system.

With reference to the accompanying drawings, FIG. 2 is a block diagram of a network resource availability indicating system 10 in accordance with the invention. Client systems 104 query system 10 to determine the availability of a network resource 106, as will be described below. System 10 includes a memory 12, a processing unit (PU) 14, input/output devices (I/O) 16 and a bus 18. A database 20 may also be provided for storage of data relative to processing tasks. Memory 12 includes a program product 22 that, when executed by PU 14, comprises various functional capabilities described in further detail below. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems. PU 14 may likewise comprise a single processing unit, or a plurality of processing units distributed across one or more locations. A server computer typically comprises an advanced mid-range multiprocessor-based server, such as the RS6000 from IBM, utilizing standard operating system software, which is designed to drive the operation of the particular hardware and which is compatible with other system components and I/O controllers. I/O 16 may comprise any known type of input/output device including a network system, modem, keyboard, mouse, scanner, voice recognition system, CRT, printer, disc drives, etc. Additional components, such as cache memory, communication systems, system software, etc., may also be incorporated into system 10.

As shown in FIG. 2, program product 22 may include a query component 24, a status component 26 and other system components 28. Other system components 28 may include any other functions required for operation of system 10 not expressly described herein. Query component 24 may include a query indicator 30 and an average query completion determinator 34. Status component 26 may include a status determinator 40 and a status indicator 42. The functions of the above components will be described below.

Figure 3A:
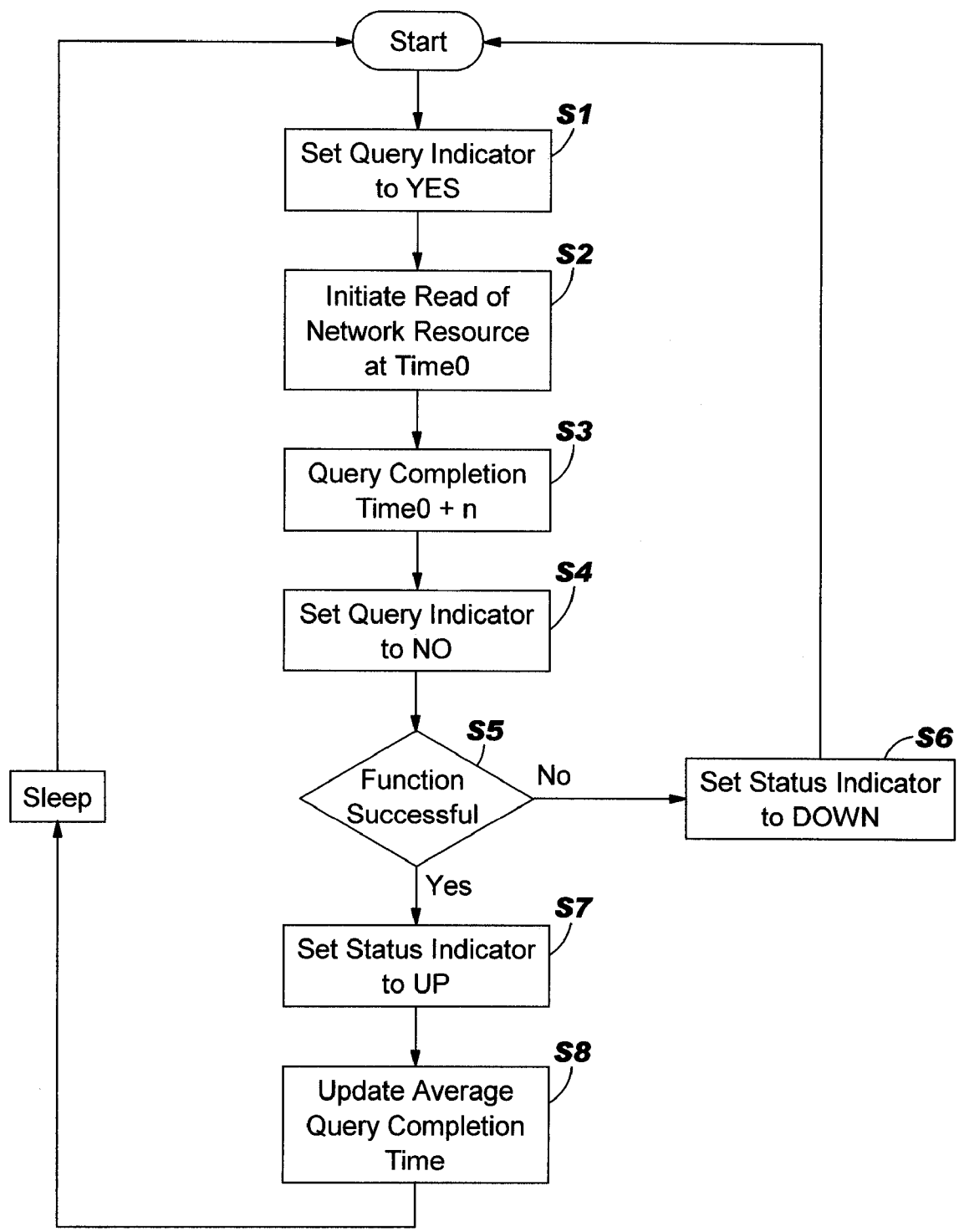
FIGS. 3A-3C show flow diagrams illustrating a first embodiment of operational methodology of the system of FIG. 2.
Figure 3B:
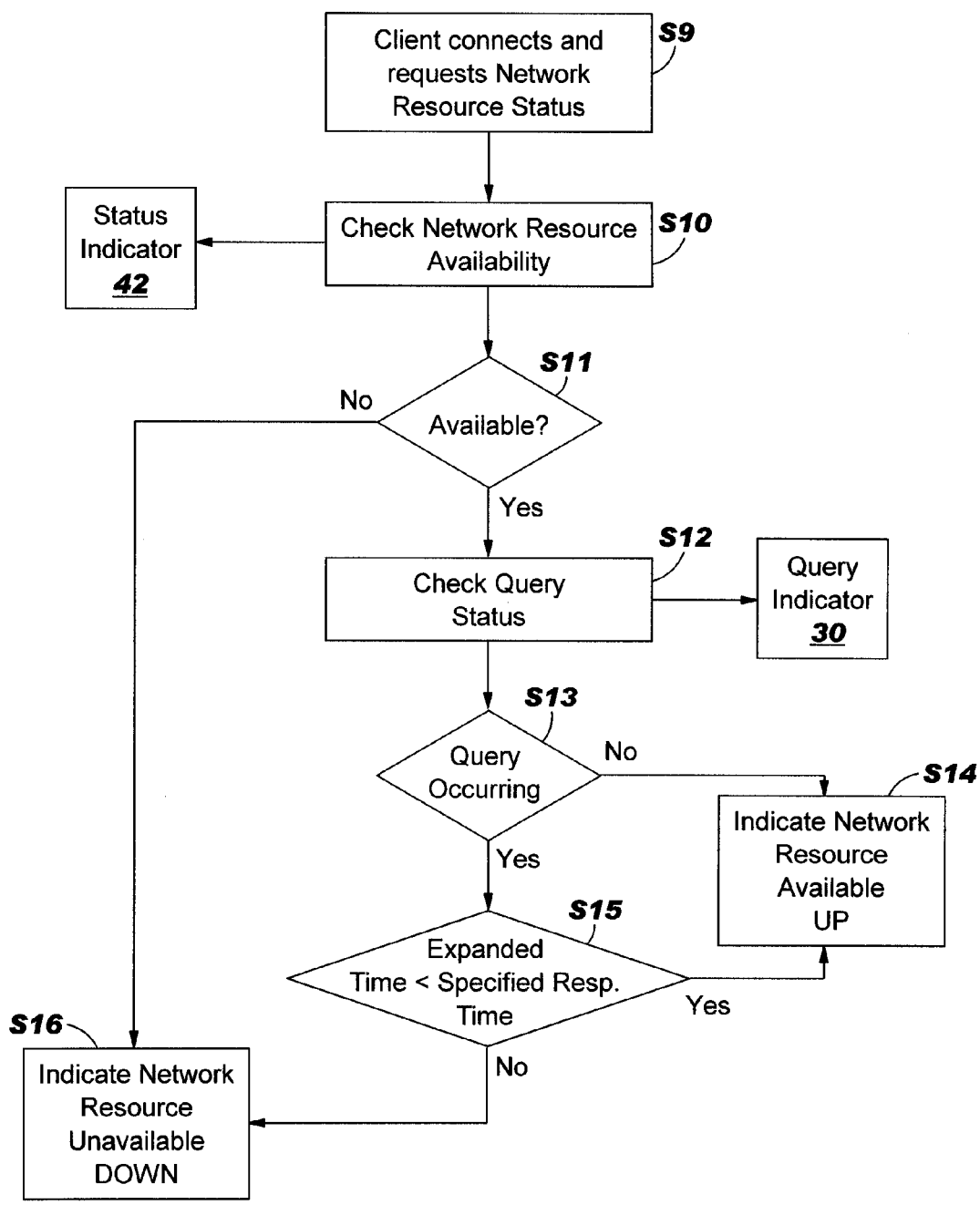

Turning to FIGS. 3A-3B in conjunction with FIG. 2, a flow diagram illustrating a first embodiment of a method for indicating availability of a network resource in a client-server environment of system 10 is shown. Steps S1-S8 represent a querying loop that queries the availability of network resource 106 to determine network resource availability and response time, and steps S9-S16 represent a status loop that determines availability and indicates an availability status to a number of client systems 104. Each loop may function simultaneously.

Referring to FIG. 3A, in a first step S1, query component 24 begins a query of network resource 106 by setting a query indicator 30 to YES, which indicates that a query is occurring. At step S2, query component 24 initiates a read of network resource 106, e.g., a server, at a time 0. The term "read" is used to indicate the function relative to a network resource in the form of a server. It should be recognized that the actual query function, e.g., read, write, poll, etc., may vary depending on the type of network resource in question. At step S3, the query check completes at a time 0+n, where n is a time duration. At step S4, query component 24 sets query indicator to NO, which indicates that a query is not presently occurring.

In step S5, query component 24 determines whether the function, e.g., read, was successful. At steps S6-S7, query component 24 sets a status indicator 30 with the network resource availability. If the function was unsuccessful, i.e., NO at step S5, then at step S6, query component 24 sets status indicator 42 to DOWN, which indicates network resource 106 is unavailable. Subsequently, processing returns to step S1 to monitor when network resource 106 becomes available again. That is, the querying steps repeats querying the network resource in the case that the network resource is unavailable. If the function was successful, i.e., YES at step S5, then at step S7, query component 24 sets status indicator 42 to available or UP, which indicates network resource 106 is available.

Next, at step S8, average query completion time determinator 34 updates an average query completion time using the query duration time n. The average query completion time is generated over a number of queries. A sleep period may follow step S8 prior to a new query beginning.

Turning to FIG. 3B in conjunction with FIG. 2, the status loop starts at step S9 with a client system 104 connecting to system 10 and requesting a status of network resource 106. In one embodiment, a client system 104 seeking information on network resource 106 (e.g., server "X") will contact a TCP/IP port for that network resource (e.g., "Xport") on system 10, rather than negotiating a contact and accessing network resource 106, e.g., file directories of a server. At step S10, status component 26 checks the availability of network resource 106 by checking status indicator 42. If the network resource is unavailable, i.e., NO at step S11, then processing proceeds to indicate the network resource is unavailable, i.e., DOWN, at step S16. In one embodiment, status component 26 may make this indication via a TCP/IP port ("Xport") by responding with either a "1" or a "0" indicating whether network resource 106 (e.g., server "X") is available/up or unavailable/down. In any event, system 10 increases the speed at which network resource status can be determined by an application.

In the case that status indicator 42 indicates that network resource 106 is available, i.e., YES at step S11, then at step S12, status component 26 determines whether a query of network resource is occurring by checking query indicator 30. That is, whether steps S1-S8 (FIG. 3A) are currently querying network resource 106 and query indicator 30 accordingly indicates that with 'YES.' In the case that a query is not occurring, i.e., query indicator 30 is set to NO, then status component indicates that network resource is available, i.e., UP, at step S14, to a client.

In the case that a query is occurring, i.e., YES at step S13, status component 26 indicates network resource 106 is available to a client 104 only if an expanded time of the query is less than a specified response time, as determined at step S15. In particular, status determinator 40 (FIG. 2) determines whether an expanded time of the currently occurring query is longer than a specified response time. In this fashion, if a query is taking an exceptionally long period to complete in the querying loop S1-S8, status component 26 can indicate the network resource is unavailable even if the querying loop has not reached that conclusion. In one embodiment, the specified response time is defined as a value within a threshold of the average query completion time, e.g., the average successful completion time plus some multiple of the standard deviation of successful completion times. That is, status component 26 indicates the network resource 106 is unavailable if a currently occurring query is taking an unacceptably long time, when compared with the average query completion time.

In the case that the expanded time is less than the specified response time, i.e., YES at step S15, then processing proceeds to step S14 at which status component 26 indicates that network resource 106 is available, i.e., UP, to a client. Alternatively, if the expanded time frame is not less than the specified response time, i.e., NO at step S15, then status component 26 indicates the network resource 106 is unavailable, i.e., DOWN, at step S16.

Figure 3C:
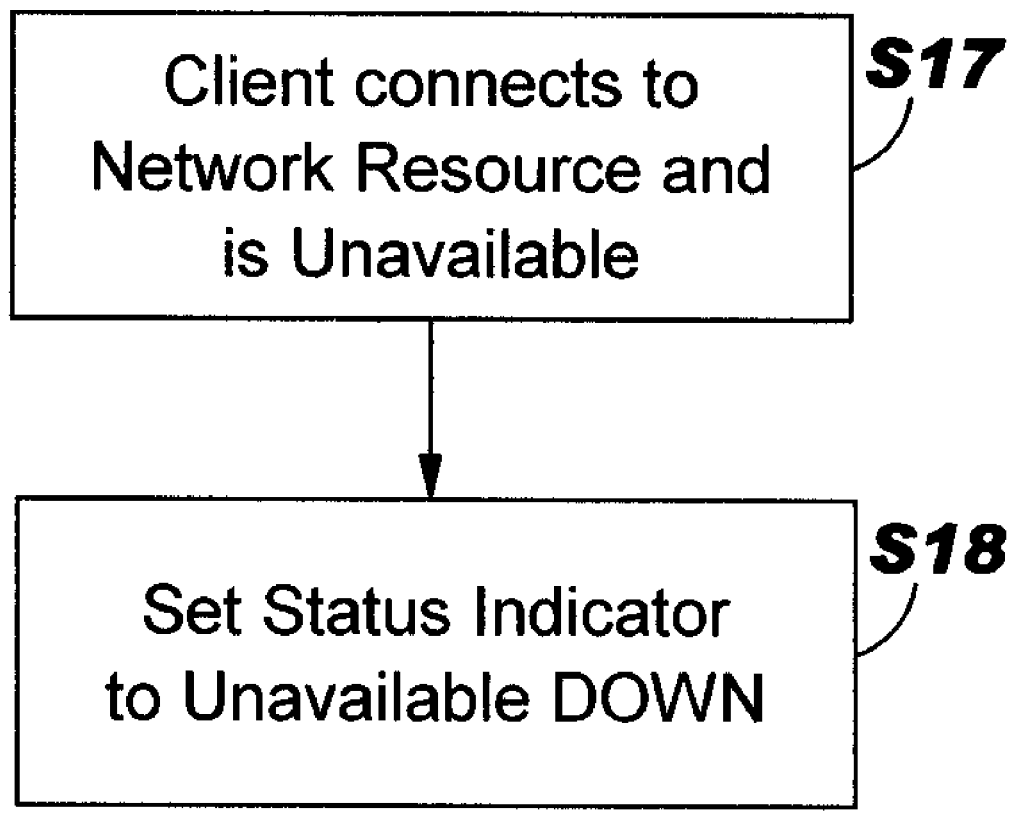

Turning to FIG. 3C, as an alternative embodiment, if a client accesses the network resource 106 and determines in process S17 that network resource 106 is unavailable, the client 104 may in process S18 set status indicator 42 to unavailable, i.e., DOWN. In this fashion, the most up-to-date information regarding network resource 106 availability can be maintained, even in the event of system 10 falsely reporting network resource 106 as available. Processing then proceeds as indicated above.

The above-described processing can occur at the initiation of each transaction requested by a client. However, in a preferred embodiment, the process can occur at the beginning of each step of a transaction to prevent a transaction from starting, and then being delayed if the network resource becomes unavailable.

While the above-described system 10 has been illustrated as a separate system, it should be recognized that system 10 may be implemented as part of a client system 104. However, this implementation has disadvantages relative to resource usage on client system 104.

Once the availability of network resource 106 has been ascertained, client system 104 can proceed to take appropriate action. That is, if network resource 106 is available, client system 104 can access the network resource. If network resource 106 is unavailable, client system 104 can avoid an indefinite delay by not accessing network resource 106 and is able to take immediate action, for instance, return a fail-code to the application, or a message to the user.

In the previous discussion, it will be understood that the method steps discussed are performed by a processor, such as PU 14 of system 10, executing instructions of program product 22 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form. It should also further be understood that the present invention could be offered as a business method whereby users are charged on a fee or subscription basis.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

The invention claimed is:

1. A computer-implemented method for indicating availability of a network resource in a client-server environment, the method comprising:
  providing at least one computing device for performing the following:
  querying the network resource, using a query component, to determine network resource availability and response time, and setting a status indicator with respect to the network resource availability, using a status component;
  in the case that the status indicator indicates that the network resource is available, determining whether a query of the network resource to determine network resource availability and response time is occurring;
  in the case that a query is occurring, setting the status indicator to indicate the network resource is available only if a time of the query is less than a specified response time, wherein the specified response time is calculated based on a range of response times determined by an average query completion time and a standard deviation of an average query completion time, a portion of the standard deviation of the average query completion time indicating an unacceptably long query time, the average query completion time determined using the response time only in the case that the network resource is available; and
  dynamically updating the average query completion time and the specified response time, using the query component, by repeatedly querying the network resource.

2. The method of claim 1, wherein, in the case that the status indicator indicates the network resource is available and a query is not occurring, indicating that the network resource is available.

3. The method of claim 1, wherein the querying includes repeating querying the network resource in the case that the network resource is unavailable.

4. The method of claim 1, wherein the querying includes setting a querying indicator that indicates whether querying is occurring, and the determining includes checking the querying indicator.

5. The method of claim 1, wherein the specified response time is equal to a value within a threshold of the average query completion time.

6. The method of claim 1, further comprising setting the status indicator to unavailable, using the status component, in the case that a client accesses the network resource and the network resource is unavailable.

7. A computer system for indicating availability of a network resource in a client-server environment, the system comprising:
 a computer device including:
  a query computer component that determines network resource availability and response time, wherein the query component sets a status indicator with respect to the network resource availability; and
  a status computer component that communicates the network resource availability as available only if, after the status indicator indicates that the network resource is available, a determination is made that a query of the network resource to determine network resource availability and response time is occurring and, in the case that a query is occurring, the time of the query is less than a specified response time, wherein the specified response time is calculated based on a range of response times determined by an average query completion time and a standard deviation of an average query completion time, a portion of the standard deviation of the average query completion time indicating an unacceptably long query time, the average query completion time determined using the response time only in the case that the network resource is available; and wherein the status computer component dynamically updates the average query completion time and the specified response time by repeatedly querying the network resource.

8. The system of claim 7, wherein the status component indicates, in the case that the status indicator indicates the network resource is available and a query is not occurring, that the network resource is available.

9. The system of claim 7, wherein the query component repeats querying the network resource in the case that the network resource is unavailable.

10. The system of claim 7, wherein the query component sets a querying indicator that indicates whether querying is occurring.

11. The system of claim 7, wherein the specified response time is defined as a value within a threshold of the average query completion time.

12. The system of claim 7, wherein the status component sets a status indicator to unavailable in the case that a client accesses the network resource and the network resource is unavailable.

13. A computer program product comprising a tangible computer useable medium having computer readable program code embodied therein for indicating availability of a network resource in a client-server environment, the program product comprising:
 program code configured to query the network resource to determine network resource availability and response time, and set a status indicator with respect to the network resource availability; and
 program code configured to indicate a status of the network resource by:
 determining, in the case that the status indicator indicates that the network resource is available, whether a query of the network resource to determine network resource availability and response time is occurring;
 setting the status indicator to indicate, in the case that a query is occurring, the network resource is available only if a time of the query is less than a specified response time, wherein the specified response time is calculated based on a range of response times determined by an average query completion time and a standard deviation of an average query completion time, a portion of the standard deviation of the average query completion time indicating an unacceptably long query time, the average query completion time determined using the response time only in the case that the network resource is available; and
 dynamically updating the average query completion time and the specified response time by repeatedly querying the network resource.

14. The program product of claim 13, wherein the status program code also indicates, in the case that the status indicator indicates the network resource is available and a query is not occurring, that the network resource is available.

15. The program product of claim 13, wherein the querying program code includes program code configured to repeat querying the network resource in the case that the network resource is unavailable.

16. The program product of claim 13, wherein the query program code includes program code configured to set a querying indicator indicating whether querying is occurring, and wherein the status program code checks the querying indicator to determine whether querying is occurring.

17. The program product of claim 13, wherein the specified response time is defined as a value within a threshold of the average query completion time.

18. The program product of claim 13, wherein the status program code is further configured to set the status indicator to unavailable in the case that a client accesses the network resource and the network resource is unavailable.

19. A computer-implemented method for indicating availability of a network resource in a client-server environment, the method comprising:
 providing at least one computing device for performing the following:
 querying the network resource, using a query component, to determine network resource availability and response time, and setting a status indicator with respect to the network resource availability, using a status component;
 indicating the network resource is available only if, after the status indicator indicates that the network resource is available, a determination is made that a query of the network resource to determine network resource availability and response time is occurring and, in the case that a query is occurring, the time of the query is less than a specified response time, wherein the specified response time is calculated based on a range of response times determined by an average query completion time and a standard deviation of an average query completion time, a portion of the standard deviation of the average query completion time indicating an unacceptably long query time, the average query completion time determined using the response time only in the case that the network resource is available; and dynamically updating the average query completion time and the specified response times using the query component, by repeatedly querying the network resource.

20. The method of claim 19, further comprising, in the case that the status indicator indicates the network resource is available and a query is not occurring, indicating that the network resource is available.

21. The method of claim 19, wherein the querying includes repeating querying the network resource in the case that the network resource is unavailable.

22. The method of claim 19, wherein the querying includes providing a querying indicator that indicates whether querying is occurring, and the determining step includes checking the querying indicator.

23. The method of claim 19, wherein the specified response time is defined as a value within a threshold of the average query completion time.

24. The method of claim 19, further comprising setting the status indicator to unavailable, using the status component, in the case that a client accesses the network resource and the network resource is unavailable.

25. A system for deploying a network resource availability indication application, comprising:

a computer infrastructure having a computer device and being operable to:

receive a query from a client regarding the availability of the network resource;

query the network resource to determine network resource availability and response time;

set a status indicator with respect to the network resource availability;

determine whether a query of the network resource to determine network resource availability and response time is occurring in the case that the status indicator indicates that the network resource is available;

provide an indication to the client that the network resource is available only if a time of the query is less than a specified response time in the case that a query is occurring, wherein the specified response time is calculated based on a range of response times determined by an average query completion time and a standard deviation of an average query completion time, a portion of the standard deviation of the average query completion time indicating an unacceptably long query time, the average query completion time determined using the response time only in the case that the network resource is available; and dynamically update the average query completion time and the specified response time by repeatedly querying the network resource.

\* \* \* \* \*

UNITED STATES PATENT AND TRADEMARK OFFICE
CERTIFICATE OF CORRECTION

| | | |
|---|---|---|
| PATENT NO. | : 7,660,888 B2 | Page 1 of 1 |
| APPLICATION NO. | : 10/709671 | |
| DATED | : February 9, 2010 | |
| INVENTOR(S) | : Smyth et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1250 days.

Signed and Sealed this

Thirtieth Day of November, 2010

David J. Kappos
*Director of the United States Patent and Trademark Office*